United States Patent
Monga et al.

(10) Patent No.: US 7,688,470 B2
(45) Date of Patent: Mar. 30, 2010

(54) SYSTEM AND METHOD FOR COLOR CALIBRATION INCORPORATING GRAY-COMPONENT REPLACEMENT USING BLACK VALUE AND INTERMEDIATE COLOR VARIABLE INPUT

(75) Inventors: Vishal Monga, Torrance, CA (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 606 days.

(21) Appl. No.: 11/613,861

(22) Filed: Dec. 20, 2006

(65) Prior Publication Data
US 2008/0151333 A1    Jun. 26, 2008

(51) Int. Cl.
*H04N 1/60* (2006.01)
(52) U.S. Cl. .................. 358/1.9; 358/518; 358/529
(58) Field of Classification Search .............. 358/1.9, 358/518, 521, 529, 530; 382/162, 167
See application file for complete search history.

(56) References Cited
U.S. PATENT DOCUMENTS

| 5,305,119 A | 4/1994 | Rolleston et al. |
| 5,528,386 A | 6/1996 | Rolleston et al. |
| 5,923,774 A * | 7/1999 | Ostromoukhov ............ 382/162 |
| 2004/0257595 A1 | 12/2004 | Sharma et al. |
| 2006/0061782 A1 | 3/2006 | Yao |
| 2006/0061783 A1 | 3/2006 | Yao |

OTHER PUBLICATIONS

Bala, R.; Digital Color Imaging Handbook, Chapter 5 "Device Characterization", CRC Press, 2003.

* cited by examiner

*Primary Examiner*—Scott A Rogers
(74) *Attorney, Agent, or Firm*—Duane C. Basch; Basch & Nickerson LLP

(57) ABSTRACT

Disclosed are systems and methods for color calibration incorporating gray-component replacement, and more particularly, controlling gray component replacement in a color output device by applying a pre-defined transformation to a plurality of non-black channels to obtain at least one intermediate variable, and determining at least one output black (K) value from both the black channel input value and the intermediate variable, in order to provide control of gray component replacement in the color output device.

20 Claims, 4 Drawing Sheets

SYSTEM AND METHOD FOR COLOR CALIBRATION INCORPORATING GRAY-COMPONENT REPLACEMENT USING BLACK VALUE AND INTERMEDIATE COLOR VARIABLE INPUT

Disclosed is a method and system for color calibration incorporating gray-component replacement, and more particularly, controlling gray component replacement in a color output device by applying a pre-defined transformation to a plurality of non-black channels to obtain at least one intermediate variable, and determining at least one output black (K) value from a black channel input value and the intermediate variable, to provide control of gray component replacement in the color output device.

BACKGROUND AND SUMMARY

In various business and technical environments, color is essential as a component of communication, in part because color facilitates the sharing of knowledge and ideas. Color images are commonly represented as one or more separations, each separation comprising a set of color density signals for a single primary or secondary color. Color density signals are commonly represented as image pixels which, in a digital image embodiment, vary in magnitude from a minimum to a maximum, with a number of gradients corresponding to the bit density of the system. Thus, for example, a common 8-bit system can provide 256 shades for each primary color.

A color, in the digital realm, can be represented as the combination of magnitudes of each color separation, which when viewed together present the combination color. Usually, printer signals include three subtractive primary color signals (i.e., Cyan (C), Magenta (M) and Yellow (Y)) and a Black (K) signal, which together can be considered the printer colorant signals. Each color signal forms a separation and is often processed on its own channel in a color printing system, and when combined together with the other separations forms the color image.

It is desirable to specify document properties in a device-independent fashion in order to facilitate the exchange and reuse of documents where possible. Colors are, therefore, preferably specified in a device-independent color space based on the characteristics of human vision. In order to print or display a given color, it is often necessary to determine the device control values corresponding to specified device-independent color values, because the native control spaces of output devices (e.g., a printer's CMYK values) do not constitute device-independent color spaces. As described for example in US Patent Publication 20040257595 by G. Sharma et al., for a "Two-Dimensional Calibration Architectures for Color Devices," hereby incorporated by reference in its entirety, the calibration process by which colors are represented in device-independent fashion can normally be accomplished utilizing a three-step procedure.

First, a set of color patches with pre-defined device control values is output on the device and the color of each patch is measured in device-independent color coordinates. Second, utilizing the device control values and the corresponding measured device-independent color values, a "forward device-response function" can be estimated. Third, the "forward device-response function" can be "inverted" to obtain a "device-correction-function".

The "forward device-response function" of step two represents the mapping from device control values to the device independent color values produced by the device in response to the control values. The "device-correction-function" of step three maps each device-independent color to the device control values that produce the specified device-independent color value on the output device. The "device-correction-function" is typically pre-computed and stored in memory. In order to produce a given color on the output device, the corresponding device-independent color values are mapped through the "device correction-function" to obtain control values. When the device is driven with such control values, a desired color can be produced by an output device in response to device-independent input signals.

As described by G. Sharma et al, a common practice is to separate the "device correction-function" into two parts: a "calibration" function that immediately precedes the device and a "characterization" function, which addresses the device "through" the calibration function. This separation is illustrated in FIG. 1 for the case of a conventional CMYK printer. In FIG. 1, a conventional system 100 is depicted, which can be implemented, for example, as a color (CMYK) printer. The system 100 can be subdivided into a "device-correction function" 105 and a "calibration device" portion 107. The "device correction function" 105 can be further partitioned into characterization and calibration portions, respectively represented by a characterization routine 102 and a calibration unit 104.

A device independent color signal(s) can be provided as input 110 to the characterization routine 102, the output of which can be fed to a calibration unit 104. The output from calibration unit 104 is, in turn, provided to an output device 106 such as a color xerographic printing engine as indicated by an output line 114. Additionally, line 112 indicates alternate CMYK (i.e., fast emulation), where data can be output from a reprint path unit 108 and fed to the calibration unit 104. In FIG. 1, the "calibration device" portion 107 of system 100 can be formed generally from calibration unit 104 and output device 106.

Another example of a calibration system includes U.S. Pat. No. 5,305,119 to Rolleston et al, "Color Printer Calibration Architecture," which issued on Apr. 19, 1994 and is assigned to Xerox Corporation. U.S. Pat. No. 5,305,119 is generally directed toward a method of calibrating a response of a printer to an image described in terms of calorimetric values. A further example of a calibration method and system is described in U.S. Pat. No. 5,528,386 to Rolleston et al, "Color Printer Calibration Architecture," which issued on Jun. 18, 1996 and is also assigned to Xerox Corporation. U.S. Pat. No. 5,528,386 generally describes a conventional one-dimensional architecture. U.S. Pat. Nos. 5,305,119 and 5,528,386 are both hereby incorporated by reference in their entirety. An example of multidimensional calibration is also found, for example, in US Patent Publications 20060061783 for "Calibration of Color Devices" by M. Yao, and 20060061782 for "Calibration of Color Devices" by M. Yao, both of which are hereby incorporated by reference in their entirety.

As briefly mentioned above, color management is commonly partitioned into a characterization and a calibration transform for output devices. One goal of calibration is to determine a transform from CMYK to C'M'Y'K' that maintains a desired printer response in selected regions of color space. Additionally, in commercial products, the calibration transform must balance computational efficiency with a reasonable memory size so that it can be incorporated within high-speed real-time printing architectures. Hence, calibration architectures vary in the degree of control provided provide and the underlying cost (i.e. required measurements), storage and/or computation.

The purpose of a "calibration transformation" described above is to facilitate a trade-off. Unlike the "full device-correction function," calibration transformation provides control of the output device in a limited and exclusive fashion. In comparison to the full device-correction function, however, the calibration transformation also offers significant advantages in that it requires substantially reduced measurement effort and a substantially lower computational effort. The lower computational effort requirement allows such a process, and associated components, to be incorporated in high-speed, real-time printing systems and image-processing chains for which the full device-correction function may be too computationally and/or memory intensive. For color output devices, particularly those utilized in the printing arts, calibration can be performed for the Black (K) channel independently and for the Cyan (C), Magenta (M), and Yellow (Y) channels either independently or together.

Moreover, as will be described in more detail below, it is also desirable to control gray-component replacement in such systems. Standard printer calibration performed with 1-D tone reproduction curves (TRCs) applied channelwise to each C, M, Y and K channel, does not take colorant interactions into account. Specifically, for many devices the interaction between the black (K) channel and C, M and/or Y colorants, as defined by a gray component replacement (GCR) strategy, is crucial to the accuracy and consistency of the rendered color. Recently, printer calibration techniques have been proposed that account for interactions among the Cyan, Magenta and Yellow colorants by means of 2-D or multi-axis color transforms (e.g., as described by G. Sharma et al. in US Application 20040257595). However, these methods still ignore the significant interaction between K and C,M,Y. A calibration technique that exploits the knowledge of this interaction would, therefore, be desirable.

As an example, traditional one-dimensional (1-D) calibration is implemented using simple 1-D look-up tables (LUTs) to transform from CMYK input to a C'M'Y'K' output. The one-dimensional representation is the most cost effective, but significantly limits the control available over the device color gamut. On the other hand, a three-dimensional (3-D) calibration (3 to 1 LUTs for CMY, 1-D for K) and four-dimensional (4-D) calibration transforms enable significantly more control but tend to require prohibitively large measurements, storage and/or real-time computation. As an intermediate alternative, 2-D and multi-axis calibration transforms have been developed recently that provide superior cost-quality trade-offs (e.g., US Application 20040257595 by G. Sharma et al.). US Application 20040257595 describes a traditional three-color, one-dimensional calibration transformation system, where C, M, and Y inputs to transformations respectively produce C', M' and Y' outputs, where in general the following equations (1A-C) can be employed:

$$C'=f_1(C); M'=f_2(M); \text{ and } Y'=f_3(Y) \quad \text{Eq. 1A-1C}$$

It will be appreciated that the dimensionality of the calibration transform dictates a cost versus quality trade-off. To offer an intermediate solution along this trade-off, the 2-D calibration transform was proposed in US Application 20040257595 by Sharma et al., the use of 2-D look-up tables for the control of C, M and Y channels was disclosed with K handled independently via a traditional 1-D look-up table. Mathematically, the use of 2-D look-up tables for the calibration transform for mapping input CMY to output C'M'Y' may be expressed using two intermediate variables for each output variable that are a function of input CMY. The output C', M', and Y' is then determined by the corresponding two intermediate variables as follows:

$$(s_1, t_1) = v_{i1}(C, M, Y), \quad \text{Eq. 2A}$$

$$(s_2, t_2) = v_{i2}(C, M, Y), \quad \text{Eq. 2B}$$

$$(s_3, t_3) = V_{i3}(C, M, Y); \text{ and} \quad \text{Eq. 2C}$$

$$C' = f_1(s_1, t_1), \quad \text{Eq. 3A}$$

$$M' = f_2(s_2, t_2), \quad \text{Eq. 3B}$$

$$Y' = f_3(s_3, t_3). \quad \text{Eq. 3C}$$

where $s_k$, $t_k$ are intermediate variables that depend on the input CMY. The output C' is determined by $s_1$ and $t_1$, the output M' is determined by $s_2$ and $t_2$, and the output Y' is determined by $s_3$ and $t_3$.

A common shortcoming of the aforementioned calibration transforms (with the exception of a full 4-D transform) is that they all treat the black (K) channel independently and do not account for or address its interactions with the cyan, magenta and/or yellow colorants. Gray-component replacement (GCR) strategies, that determine the mapping from CMY to CMYK, are central to this interaction. The various embodiments disclosed herein address exactly this interaction and develop a novel two-dimensional calibration transform for the K channel.

Disclosed herein is a novel calibration scheme for the K channel that takes into account interactions with C, M and Y. In particular, a two-dimensional calibration look-up table has been derived for the K channel, where a first dimension is input K, and a second dimension is a function of C, M, Y. This multidimensional (2-D) look-up table further exploits the knowledge of the underlying GCR strategy to calibrate along a neutral CMYK locus. In addition, other important axes such as pure K and C=M=Y can also be independently calibrated. The proposed look-up table can be combined with traditional 1-D or 2-D look-up tables for C, M and Y.

Experimental results establish that using a gray-component replacement method enables more accurate rendition of dark colors and also significantly enhances temporal stability of the device. The disclosed system and method is readily implemented via the use of a 2-D look-up table for the K channel, and explicit specification of the GCR strategy in the calibration step. The method could be implemented in the digital front end or DFE (e.g. Xerox® DocuSP™), or directly in the image output terminal/marking engine (IOT). The method is also pertinent to on-line feed-back controls.

Disclosed in embodiments herein is a method for controlling gray component replacement during color calibration of an output device, comprising: receiving image input values for a black channel and at least one non-black channel; applying a pre-defined transformation on said at least one non-black channel to obtain at least one intermediate variable; and determining at least one output black (K) value from a black channel input value and the at least one intermediate variable, to provide control of gray component replacement in the output device.

Further disclosed in embodiments herein is system for controlling gray component replacement during color calibration of a color output device, comprising: a black channel; a plurality of non-black channels; a pre-defined transformation, said transformation applied to said non-black channels to obtain at least one intermediate variable; and at least one output black (K) value determining stage, determining the output black (K) value from a black channel input value and the at least one intermediate variable, to provide control of gray component replacement in the color output device.

Also disclosed in embodiments set forth herein is a digital front end processing system for controlling gray component replacement during color calibration of a color xerographic printer, comprising: a black image data processing channel; cyan, magenta and yellow data processing channels; a pre-defined transformation, said transformation applied to said cyan, magenta and yellow channels to obtain at least one intermediate variable; and at least one output black (K) value determining stage, determining the output black (K) value from a black channel input value and the at least one intermediate variable, to provide control of gray component replacement in the color output device.

The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

As more particularly set forth below, the disclosed system and methods are directed to controlling gray component replacement in a color output device, including the determining black (K) channel output in response a black channel input value and at least one intermediate variable determined as a function of at least one other (non-black) color channel. The disclosure further describes a calibration method that exploits interactions between black (K) and non-black colors such as CMY that are not accounted for by existing calibration architectures or transforms. In general, these interactions may be four-dimensional in nature; however, in practice, the relationship between black (K) and non-black colors (CMY) is primarily influenced by the gray component replacement strategy employed. With the gray component replacement constraints, it is possible to capture the interaction between black (K) and CMY with a simpler lower-dimensional (e.g., 2-dimensional) calibration transform.

Figure 1:
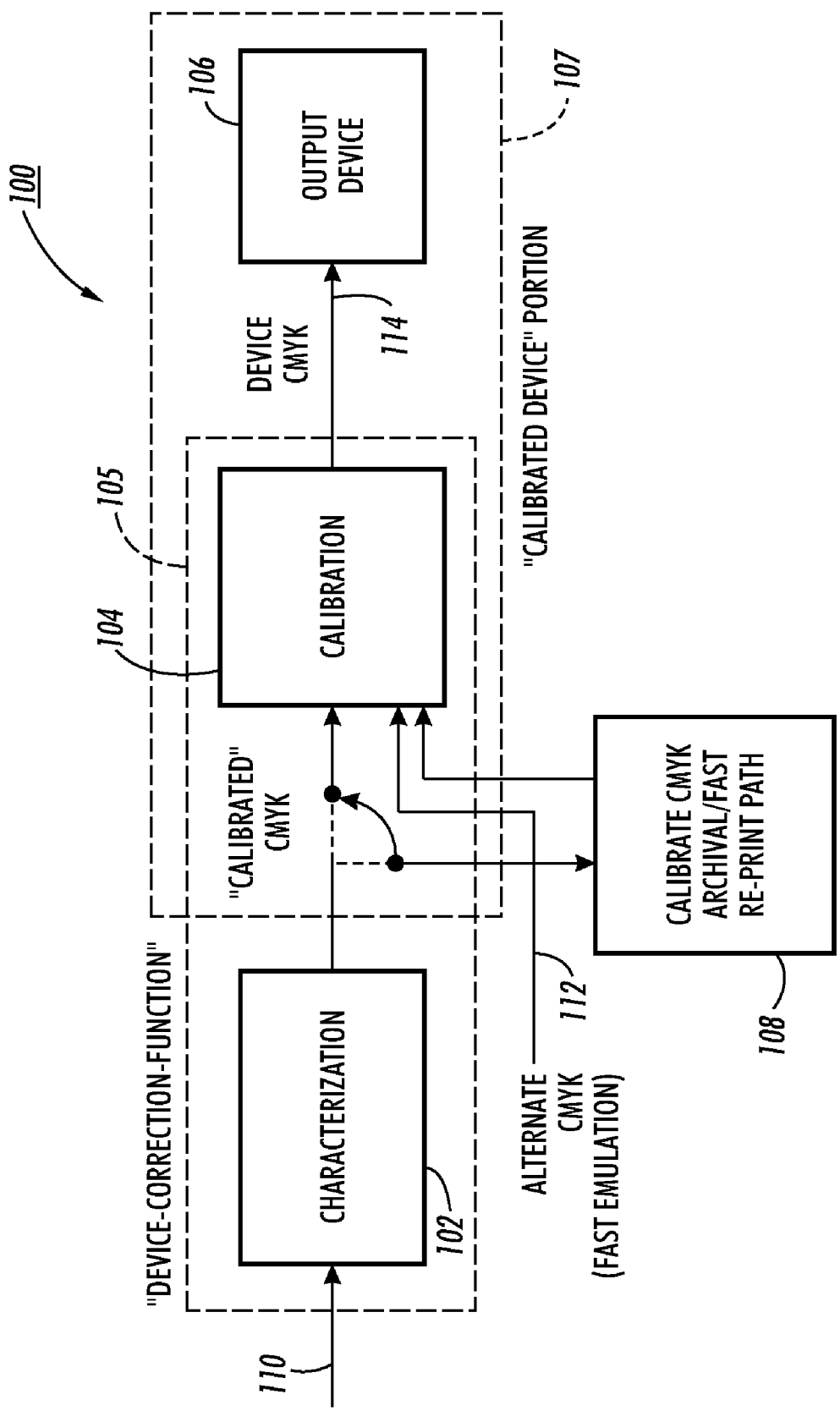
FIG. 1 is block diagram of a conventional color printing machine that provides an embodiment for the disclosed system and method.
Figure 2:
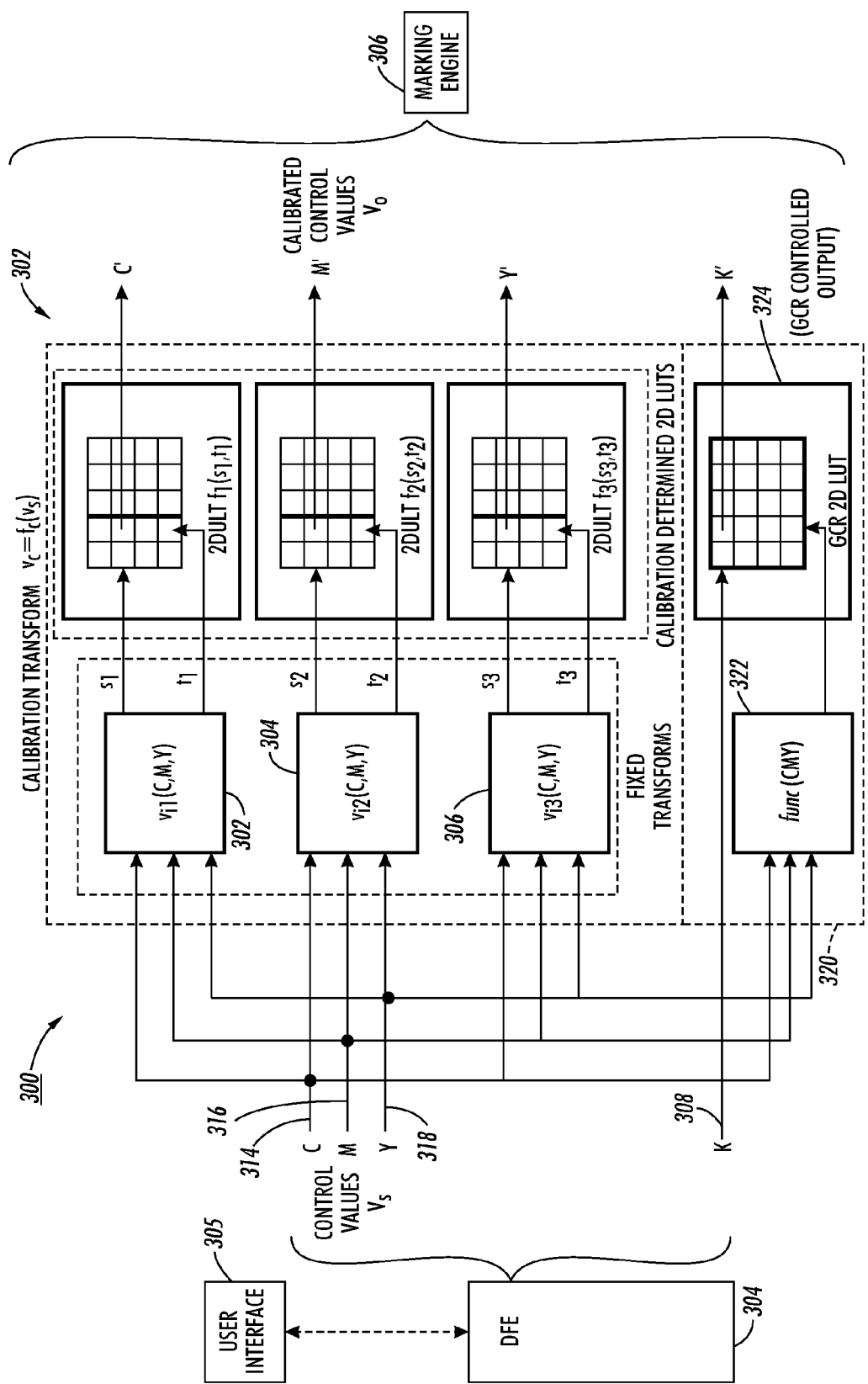
FIG. 2 is a schematic illustration of an embodiment of the system and method disclosed herein.

As generally depicted in FIG. 2, a system for controlling gray component replacement 302 may be employed during color calibration of a color output device 300, such as a Xerox® iGen 110™ printing system, or in conjunction with a digital front end (DFE) 304 or marking engine 306. The system of FIG. 2 includes a calibration transformation system 302, which can be implemented in accordance with an embodiment of the present invention. Input channel 308 is associated with the black (K) channel, whereas input channels 314, 316, and 318 are respectively associated with the non-black or color channels C, M, and Y. In accordance with one embodiment, system 300 further includes a calibration transformation 320 that includes a functional transform 322 and a calibration-determined two-dimensional look-up table 324 for controlling the gray component replacement for the black channel. More specifically, transform 322 applies a pre-defined transformation to one or more of a plurality of input values (e.g., C, M and/or Y) on said non-black channel(s) to obtain at least one intermediate variable (e.g., min(C,M,Y)). In one embodiment, the two-dimensional look-up table 324 determines at least one output black (K) value from a black channel input value and the at least one intermediate variable, and utilizes the output black (K) value to provide control of gray component replacement in the output device or marking engine 306. The capability to control gray component replacement, for example using the two-dimensional transform illustrated, is important in various printing/rendering systems and enables output devices to more reliably produce color output as set forth in the experiments discussed below.

As illustrated in FIG. 2, system 300 may further include other one-dimensional or two-dimensional look-up tables for printer control applications pertaining to the color channels, or similar means for determining the color channel output. Although the color channels are illustrated in FIG. 2 as employing two-dimensional tables, in a reduced-memory embodiment the color channel transforms may be accomplished using one-dimensional look-up tables (not shown). As described in more detail below, the black channel (K) calibration transformation 320 utilizes at least one intermediate variable, as a function of input C, M and or Y, such that the output K' is controlled, preferably including gray component replacement.

More specifically, the system and method use a 2-dimensional look-up table for calibrating the black or K channel. The primary dimension or index for such a table must be the level or value of input K. The secondary dimension or index is some function of C, M, Y (alone or in combination). Common gray component replacement strategies specify K as a parametric function of min(C, M, Y), since the min(C,M,Y) function produces quantity that is an intuitive estimate of the amount of "black" in the CMY mixture. In one embodiment, the system and method may use min(C,M,Y) as the function in transform 322 to produce the secondary look-up table input dimension.

Figure 3:
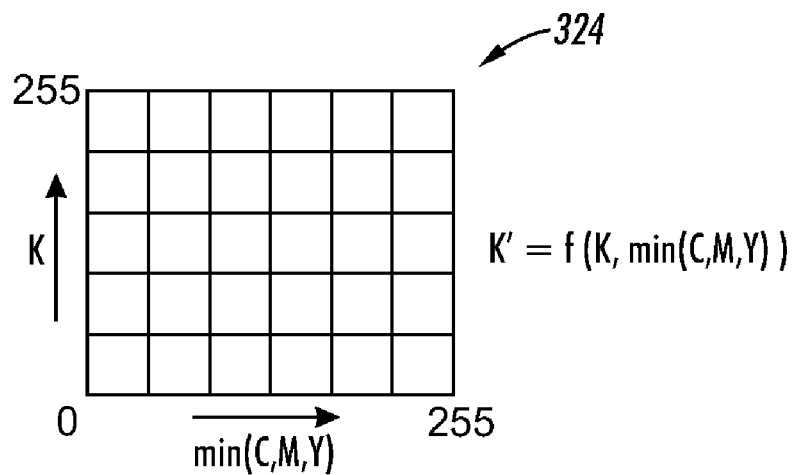
FIG. 3 is an exemplary representation of a 2-dimensional black lookup table.

As illustrated in FIG. 3, where the calibration look-up table 324 for the black (K) channel is depicted, the primary input to the look-up table is the K value whereas the secondary input is the func(C,M,Y). It will be further appreciated, however, that alternative functions of C, M and/or Y may be employed such as sum(C,M,Y), or a weighted function such as func($\alpha$C, $\beta$M,$\gamma$Y), where $\alpha$, $\beta$ and $\gamma$ are positive, non-zero coefficients intended to differentially weight the specific non-black or color channels, and other alternatives.

Figure 4:
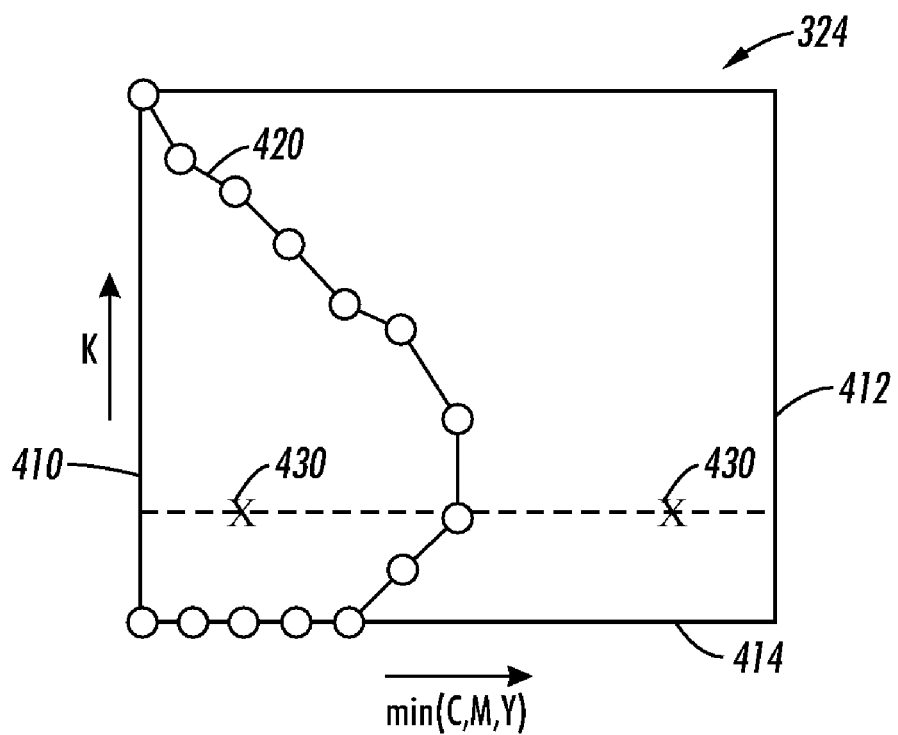
FIG. 4 depicts further detail of such a table.

Turning to FIG. 4, there is depicted, relative to the mapping of the look-up table 324 as found in FIGS. 2 and 3, a critical loci of interest in the 2-D calibration table for the K channel. Along the left side of the figure, represented by reference numeral 410, is a pure K axis, where the tone reproduction curve is calibrated to produce varying gray-level outputs in response to a K-only input (C,M and Y being equal to 0). Similarly, along the right side of the look-up table, axis 412 is intended to represent a situation where C, M and Y are completely saturated (full on). And, along the bottom or K=0 axis 414, the tone reproduction curve is representative of a 0% GCR locus. Keeping in mind that the look-up table 324 is representing interactions in a multi-color space, it is also desirable to pre-define or populate a device neutral locus 420 within the lookup table so that other points 430 may then be determined through interpolation or other mathematical methods. In other words, aspects of method further deriving the pre-defined transformation set forth in look-up table 324 prior to use for color calibration, wherein deriving the predetermined transformation comprises identifying at least one neutral or gray component replacement loci 420 of interest in the multi-dimensional look-up table, determining corrections (K') for those loci, and then interpolating to fill in other portions of look-up table 324. It should be further appreciated that aspects of the disclosed system found in FIG. 2, may also be user-selectable via interface 302, wherein selection, by a user of the output device, of a gray component replacement loci may be implemented to enable the user to have input or control during a calibration operation.

Having described the general operation of the system and method, attention is now directed to a method of populating the 2-D look-up table for the black channel (K). As briefly described above, one strategy is to identify principal loci of interest in the 2-D table, derive corrections (i.e. K') for those loci and then interpolate to fill in the balance of the look-up table. In one embodiment of the populating process the following loci are identified:

"Pure K axis" (410): K increasing from 0-255 (in steps of 1 for 8-bit digital processing) and C=M=Y=0. This is the y-axis of FIG. 4, and conceptually understood as the 100% GCR axis. This axis may be populated simply by linearizing to a metric such as ΔE from paper as in a traditional 1-D calibration process, or by other methods known to those skilled in the art.

"Full CMY ON axis" (412): the 1-D axis given by C=M=Y=255, K increasing from 0-255. Note that the upper right hand corner of the 2-D table 324 for K, for example in FIG. 4 is trivially set to the max possible K (255 for 8 bit processing). Assuming for the moment that the calibrated K value at C=M=Y=255 and K=0 is also available (this value comes from populating the "0% GCR" locus which will be explained below), the full CMY ON axis may then be populated by a simple interpolation technique between the corner points.

"True device neutral locus" (420): This locus is obtained by processing a C=M=Y sweep ranging from [0,255] through an optimal gray component replacement for the device 300 to produce ($\overline{C}, \overline{M}, \overline{Y}, K$). Locus 420 represents a plot of K vs. min($\overline{C}, \overline{M}, \overline{Y}$) in the look-up table shown in FIG. 4. It represents a CMYK rendition of the neutral axis for the device. Two crucial observations need to be made at this point. First, gray component replacement strategies along the neutral axis preserve the neutrality of the C, M, Y samples. In other words, the resulting CMYK also has $\overline{C}=\overline{M}=\overline{Y}$. Second, deciding what K to fill in must factor in that these ($\overline{C}, \overline{M}, \overline{Y}$) values get processed through their respective C, M and Y calibration transforms, for example as depicted in the upper portion of FIG. 2. Furthermore it must be considered that C=M=Y are typically processed through gray-balance tonal reproduction curves. This characterization is represented, for example, in FIG. 5.

Figure 5:
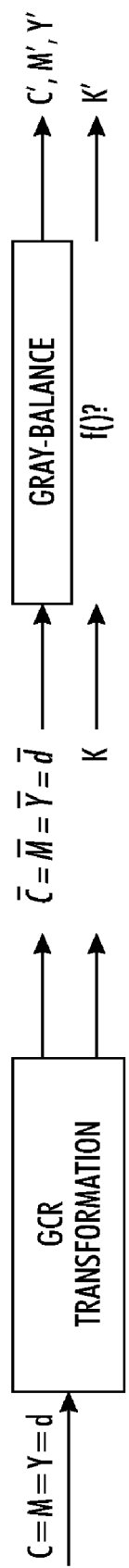
FIG. 5 is a general flow chart depicting the method for calibrating the device neutral locus in accordance with an aspect of the disclosed systems and methods.

As illustrated by FIG. 5, calibrating the device neutral locus, amounts to determining the K' values that will help satisfy a desired CIELAB response when combined with the C', M' and Y' (calibrated C, M and Y) values. Note further, that because this is the neutral axis it is defined completely by a one dimensional locus of L* aim values. Letting g(d) represent a desired L* aim, as a function of the digital level d in [0, 255], then the calibrated K' along the neutral locus is determined by a search that best meets (for example in a least-squares sense) the desired L* response:

$$K'(d) = \underset{K \in [0,255]}{\mathrm{argmin}} \|pm_{L^*}(C', M', Y', K) - g(d)\|_2, \quad \text{Eq. 4}$$

$$\text{for each } d \in [0, 255]$$

where $pm_{L^*}$ (C,M,Y,K) represents the L* value obtained from printing a CMYK combination. This value may be obtained via a printer model (e.g. Neugebauer model) that provides a mapping from printer CMYK to CIELAB values. In practice, such a printer-model can be easily determined by using measurements from the calibration targets as described, for example in the Digital Color Imaging Handbook, Chapter 5 "Device Characterization", by R. Bala, CRC Press, 2003, which is also hereby incorporated by reference in its entirety.

"0% GCR locus" (414): This locus is described simply by C=M=Y=d, (d in [0,255]) with K=0. Locus 414 is the x-axis in FIG. 4, and can be populated in a manner similar to the "true device neutral locus" by searching for K' values that (approximately) satisfy another desired CIELAB response. In this case the C'M'Y' differ from the ones employed for the device neutral locus in that they are simply the result of processing a C=M=Y=d, d in [0,255] sweep (with K=0) through the gray-balance calibration.

Once the desired loci are populated, the balance of look-up table 324 may be filled in using a one-dimensional interpolation in the horizontal (i.e. min (C,M, Y)) direction as represented by points 430 in FIG. 4. The embodiments described herein further contemplate an ability to select one or more gray component replacement loci for control during the calibration operation. In other words, the two-dimensional black (K) channel transform, look-up table 324, is determined prior to any actual image processing but it is derived as part of the calibration process so as to produce a pre-defined table for use. It is further contemplated that, for example for a zero-level K input, a non-zero K output is generated in response to a pre-defined and non-zero CMY combination, wherein the system produces a specified output, thereby enabling detection of the calibration strategy to identify the gray-component replacement. In other words, a particular and atypical input to the image processing device employing the disclosed method or system may result in an atypical output that would signal the presence of the proposed gray component replacement calibration system—thereby acting as a "signature" or "identifier" for the proposed system, or at least the calibration components. In addition, such a capability also allows for testing and troubleshooting of the calibration transform.

It will be appreciated that in an image processing embodiment, aspects of the above-described system and method may be implemented using conventional image processing components and architectures and may include not only control logic, and program-driven devices such as processors, but also memory for the look-up tables and the like. Moreover, several aspects may utilize application specific devices or components in order to improve the processing capability or speed, or to control the operation of such systems. Processing complexity and memory requirements may be important to various embodiments. For example, if a 1-D gray-balance TRC operation is used for each of the C, M and Y channels, then the total storage requirement is 768 bytes plus 64 Kb for the two-dimensional K channel look-up table (324). Alternatively, as depicted for example in FIG. 2, all four channels (C, M,Y and K) may comprise 2-D look-up tables and then the look-up memory required would be approximately 444 Kbytes. From a processing perspective, increase in measurements necessary to implement a two-dimensional look-up table for black (K) channel calibration is marginal when compared to other techniques. Patches close to CMYK corresponding to device neutrals may also be added to enhance printer-model accuracy, and the computational requirements are on the order of 2-D calibration of look-up tables for C, M and Y.

In accordance with aspects of the disclosed system and methods, the interaction of K with C, M and Y is being accounted for or adapted using the knowledge of gray component replacement along the device's neutral axes, where the human visual system is most sensitive. Possible Extensions of the disclosed embodiments include uses of the 2-D calibration transform for K, along with knowledge of the gray component replacement strategy to determine other important loci in the transform. Although the embodiments described focus on the device neutral axis; other CMYK loci may be selected, and may be calibrated in a similar manner by using the printer-model to search for the best K' values.

The following detail is directed to experimental results supporting the benefits of exploiting the knowledge of GCR into building a calibration look-up table for the K channel. The embodiment tested was based on a Xerox® iGen 110™ machine. For simplicity, the desired device independent locus g(d) for each of the loci was the L* response obtained by processing a pure K sweep through traditional 1-D linearization tone reproduction curves for K and subsequently printing and measuring the resulting color patches. This results in a straight line going from (L*max, 0, 0) to (L*min, 0, 0) where L*max corresponds to the L* value measured for the clean paper substrate and L*min corresponds to maximum possible K (=255).

In each experiment, the following different calibration methods were compared:
1. Traditional 1-D calibration: 1-D gray-balance calibration for C, M and Y and a 1-D ΔE from paper linearization calibration for K;
2. 1-D CMY and 2-D for K: 1-D gray-balance calibration for C, M and Y and proposed 2-D look-up table for K;
3. 2-D C, M, Y and 1-D for K: 2-D calibration as proposed by Sharma et al.; and
4. 2-D CMYK: 2-D look-up tables for C, M, Y as proposed by Sharma et al. and the proposed 2-D look-up table for K.

To evaluate the ability to render dark colors the experiments started with a CIELAB target of in-gamut colors corresponding to low luminance values (and hence substantial input K) and used the (inverse) characterization to obtain the CMYK which are subsequently processed through each of the respective calibrations and then printed and measured. The ΔE difference of measured versus original Lab values gives an evaluation measure for the calibration. The test used 216 randomly generated Lab values (corresponding to dark colors) for this test. Table 1 shows how each calibration fares in terms of matching the original desired Lab.

TABLE 1

| Calibration Method | Average ΔE | 95$^{th}$ percentile | Maximum ΔE |
|---|---|---|---|
| 1-D gray-balance | 3.21 | 6.11 | 8.02 |
| 1-D CMY, 2-D for K | 2.21 | 4.98 | 6.55 |
| 2-D CMY, 1-D for K | 2.83 | 4.72 | 6.80 |
| 2-D for C, M, Y and K | 2.01 | 4.55 | 5.69 |

Next, the temporal stability was evaluated by conducting the following experiment. Calibration transforms were derived (using each of the aforementioned calibration methods) at four different instances in time—referred to as printer states S1 through S4. An in-gamut test target of 240 CMYK patches was printed at each printer state and through each calibration method. In addition, the test target was also processed through each calibration derived at S1 then printed at S2 through S4.

Table 2 quantifies the ability of each calibration method to maintain a set of desired CIELAB values over time. These numbers were generated by using the measurements of the in-gamut target printed at each printer state Si, where i=1, 2, 3, 4 through each of the calibrations derived for printer state Si. Then, for any given calibration method, the pair-wise differences between CIELAB values from any two states Si and Sj were recorded and the maximum value (one corresponding to each patch in the test target) was computed across all possible pairs of printer states (Si, Sj). The aggregate statistics of those maximum values, in other words peak-peak variability, are reported in Table 2. The improved device stability by incorporating GCR using a 2-D look-up table for K is readily apparent.

TABLE 2

| Calibration Method | Average peak-to-peak ΔE | 95$^{th}$ percentile peak-to-peak ΔE | Maximum peak-to-peak ΔE |
|---|---|---|---|
| No recalibration | 7.10 | 14.21 | 15.42 |
| 1-D gray-balance calibration | 4.48 | 10.01 | 11.77 |
| 1-D CMY, 2-D for K | 4.11 | 8.83 | 10.87 |
| 2-D CMY, 1-D for K | 3.61 | 8.42 | 10.85 |
| 2-D for C, M, Y and K | 2.70 | 6.55 | 7.43 |

Table 3 essentially reports the same numbers as Table 2 but by using the same static calibration derived at a default printer state. It may be seen that even without re-calibration the smallest errors were observed using the calibration strategy that accounts for K versus CMY interactions. This suggests a less frequent need for re-calibration when employing a 2-D look-up table for K.

TABLE 3

| Calibration method | Average peak-to-peak ΔE | 95$^{th}$ percentile peak-to-peak ΔE | Maximum peak-to-peak ΔE |
|---|---|---|---|
| 1-D gray-balance | 7.10 | 14.21 | 15.42 |
| 1-D CMY, 2-D for K | 5.36 | 13.77 | 14.20 |
| 2-D CMY, 1-D for K | 5.27 | 14.71 | 15.14 |
| 2-D for C, M, Y and K | 4.56 | 10..94 | 11.83 |

As depicted, for example, in FIG. 2, calibration is typically performed for color printers 300 using a digital front end (DFE 304) with the user interface 305. The interface will enable user-controlled printing of targets that are subsequently measured and then resulting measurements used to determine the calibration transform that is loaded into the printer 300. The DFE interface 305 and calibration targets (not shown) provide a potential means for detecting a "signature" of the lookup table as noted previously. For example, the system may require the user to specify a gray component replacement strategy at the calibration step (typically GCR is only specified in the characterization step). The gray component replacement could then be used, by the calibration tool, to include or embed specific CMYK patches on a calibration target and thereby identify the system (e.g., color coded for the version, manufacturing run, etc.). A different gray component replacement specification would then result in a different calibration target.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for controlling gray component replacement during color calibration of an output device, comprising:
   receiving image input values for a black channel and at least one non-black channel;
   applying a pre-defined transformation on said at least one non-black channel to obtain at least one intermediate variable; and
   determining at least one output black (K) value from a black channel input value and the at least one intermediate variable, to provide control of gray component replacement in the output device.

2. The method according to claim 1, wherein determining at least one output black (K) value comprises applying a pre-defined transformation to the combination of the black channel input and the at least one intermediate variable to produce the output black (K) value.

3. The method according to claim 2, wherein applying a pre-defined transformation is accomplished using a multi-dimensional look-up table.

4. The method according to claim 3, wherein applying the pre-defined transformation using a multi-dimensional look-up table employs a two-dimensional look-up table.

5. The method according to claim 1, wherein applying a pre-defined transformation to a plurality of input values comprises determining a minimum of the images values from the non-black channels and setting the minimum as the intermediate variable.

6. The method according to claim 1, further comprising:
   temporarily storing as data, in memory, a plurality of input values for the black channel and the intermediate variables; and
   using the stored data as indices into at least one multi-dimensional look-up table.

7. The method according to claim 1, further comprising deriving the pre-defined transformation prior to use for color calibration.

8. The method according to claim 7, wherein deriving the predetermined transformation comprises:
   identifying at least one gray component replacement loci of interest in the multi-dimensional look-up table;
   determining corrections (K') for those loci; and
   interpolating to fill in other portions of the multi-dimensional look-up table.

9. The method according to claim 8, further comprising enabling the selection, by a user, of a gray component replacement strategy for controlling during a calibration operation.

10. A system for controlling gray component replacement during color calibration of a color output device, comprising:
    a black channel;
    a plurality of non-black channels;
    a pre-defined transformation, said transformation applied to said non-black channels to obtain at least one intermediate variable; and
    at least one output black (K) value determining stage, determining the output black (K) value from a black channel input value and the at least one intermediate variable, to provide control of gray component replacement in the color output device.

11. The system of claim 10, wherein said determining stage applies a pre-defined transformation to the combination of the black channel input and the at least one intermediate variable to produce the output black (K) value.

12. The system of claim 11, wherein said pre-defined transformation is accomplished using a multi-dimensional look-up table.

13. The method according to claim 12, wherein said multi-dimensional look-up table includes a two-dimensional look-up table.

14. The system of claim 10, wherein said pre-defined transformation determines a minimum of the images values from the non-black channels and sets the minimum as the intermediate variable.

15. The system of claim 10, further comprising:
    memory for storing, as data, a plurality of values for all channels and the intermediate variables; and
    at least one multi-dimensional look-up table, said look-up table using the stored data as indices to look up a pre-programmed output black (K) value therein.

16. A digital front end processing system for controlling gray component replacement during color calibration of a color xerographic printer, comprising:
    a black image data processing channel;
    cyan, magenta and yellow data processing channels;
    a pre-defined transformation, said transformation applied to said cyan, magenta and yellow channels to obtain at least one intermediate variable; and
    at least one output black (K) value determining stage, determining the output black (K) value from a black channel input value and the at least one intermediate variable, to provide control of gray component replacement in the color output device.

17. The system of claim 16, wherein said output black (K) value determining stage applies a pre-defined transformation to the combination of the black channel input and the at least one intermediate variable to produce the output black (K) value.

18. The system of claim 17, wherein said pre-defined transformation is includes a multi-dimensional look-up table.

19. The system of claim 16, wherein said pre-defined transformation includes a function to determine a minimum of image values from the cyan, magenta and yellow channels and sets the intermediate variable equal to the minimum.

20. The system of claim 16, further comprising:
    memory for storing, as data, a plurality of input values for all channels and the intermediate variables; and
    at least one multi-dimensional look-up table, said look-up table using the stored data as indices to look up a predetermined output black (K) value therein.

* * * * *